US010391568B2

(12) United States Patent
Fuchs

(10) Patent No.: US 10,391,568 B2
(45) Date of Patent: Aug. 27, 2019

(54) POWER TOOL SYSTEM

(75) Inventor: Rudolf Fuchs, Neuhausen (DE)

(73) Assignee: Robert Bosch GmbH, Stuttgart (DE)

( * ) Notice: Subject to any disclaimer, the term of this patent is extended or adjusted under 35 U.S.C. 154(b) by 373 days.

(21) Appl. No.: 14/002,428

(22) PCT Filed: Mar. 2, 2012

(86) PCT No.: PCT/EP2012/000938
§ 371 (c)(1),
(2), (4) Date: Nov. 12, 2013

(87) PCT Pub. No.: WO2012/116833
PCT Pub. Date: Sep. 7, 2012

(65) Prior Publication Data
US 2014/0053703 A1    Feb. 27, 2014

(30) Foreign Application Priority Data
Mar. 3, 2011    (DE) .................. 10 2011 005 019

(51) Int. Cl.
B23D 57/02    (2006.01)
B27B 17/00    (2006.01)
B27B 17/02    (2006.01)

(52) U.S. Cl.
CPC .......... B23D 57/02 (2013.01); B23D 57/023 (2013.01); B23D 57/026 (2013.01);
(Continued)

(58) Field of Classification Search
CPC .... B23D 57/02; B23D 57/023; B23D 57/026; B23D 45/025; B23D 45/027;
(Continued)

(56) References Cited

U.S. PATENT DOCUMENTS

| 680,089 A | * | 8/1901 | Untiedt ................. | B26D 1/143 |
| | | | | 83/473 |
| 1,932,511 A | * | 10/1933 | Clarke ................. | B23D 47/126 |
| | | | | 29/DIG. 79 |

(Continued)

FOREIGN PATENT DOCUMENTS

| AT | 384 389 B | 11/1987 |
| DE | 690 791 | 5/1940 |

(Continued)

OTHER PUBLICATIONS

International Search Report corresponding to PCT Application No. PCT/EP2012/000938, dated Aug. 10, 2012 (German and English language document) (7 pages).

*Primary Examiner* — Kenneth E Peterson
*Assistant Examiner* — Liang Dong
(74) *Attorney, Agent, or Firm* — Maginot, Moore & Beck LLP

(57) ABSTRACT

A power tool system comprises (i) at least one power tool, in particular a circular saw, having at least one tool support unit for supporting a tool during machining and at least one displaceably mounted tool guiding unit, and (ii) at least one power tool separation device which is arranged on the tool guiding unit. The power tool separation device comprises at least one cutting unit and at least one guide unit for guiding the cutting unit.

17 Claims, 6 Drawing Sheets

(52) U.S. Cl.
CPC ........ *B27B 17/005* (2013.01); *B27B 17/0058* (2013.01); *B27B 17/02* (2013.01); *Y10T 83/7158* (2015.04); *Y10T 83/7208* (2015.04); *Y10T 83/7264* (2015.04)

(58) Field of Classification Search
CPC .. B23D 45/046; B23D 45/048; B27B 17/005; B27B 17/0058; B27B 17/02
USPC ........... 83/803, 788, 574, 796–799, 485–489
See application file for complete search history.

(56) References Cited

U.S. PATENT DOCUMENTS

| | | | |
|---|---|---|---|
| 2,800,153 A | | 7/1957 | Barth |
| 2,992,660 A | * | 7/1961 | Merz ...................... B27B 17/02 30/123.4 |
| 4,181,115 A | * | 1/1980 | Weisner ............... B23D 59/001 125/21 |
| 4,204,320 A | * | 5/1980 | Hayashimoto .......... B27B 17/02 30/386 |
| 4,208,937 A | * | 6/1980 | Marshall ............... B27B 17/005 83/574 |
| 4,300,428 A | * | 11/1981 | Woodland ............. B27B 17/005 83/574 |
| 4,350,067 A | * | 9/1982 | Picard ................ B27B 17/0058 269/296 |
| 4,452,117 A | * | 6/1984 | Brickner .............. B23D 45/024 83/468 |
| 4,606,252 A | * | 8/1986 | Lahti ................... B27B 17/0058 83/574 |
| 4,757,735 A | | 7/1988 | Olson |
| 4,779,503 A | | 10/1988 | Mitchell |
| 4,821,415 A | * | 4/1989 | Kress ....................... B25F 3/00 30/122 |
| 4,981,129 A | | 1/1991 | Österman et al. |
| 4,986,252 A | * | 1/1991 | Holmes ................ B23Q 9/0014 125/21 |
| 5,048,389 A | * | 9/1991 | Carlton .................. B23D 61/06 83/830 |
| 2008/0210072 A1 | * | 9/2008 | Chang .................. B23D 45/048 83/471.3 |

FOREIGN PATENT DOCUMENTS

| | | |
|---|---|---|
| DE | 879 969 C | 6/1953 |
| DE | 27 34 532 A1 | 2/1978 |
| DE | 33 29 496 A1 | 3/1985 |
| DE | 34 38 361 A1 | 6/1986 |
| DE | 102 58 605 A1 | 7/2004 |
| DE | 10 2006 062 001 A1 | 3/2008 |
| DE | 20 2009 014 060 U1 | 3/2010 |
| DE | 202009014060 U1 * | 3/2010 |
| FR | 2 610 563 A1 | 8/1988 |
| FR | 2 711 180 A1 | 4/1995 |
| GB | 2 042 974 A | 10/1980 |
| RU | 2 169 070 C2 | 6/2001 |

\* cited by examiner

POWER TOOL SYSTEM

This application is a 35 U.S.C. § 371 National Stage Application of PCT/EP2012/000938, filed on Mar. 2, 2012, which claims the benefit of priority to Serial No. DE 10 2011 005 019.1, filed on Mar. 3, 2011 in Germany, the disclosures of which are incorporated herein by reference in their entirety.

BACKGROUND

Machine-tool systems which have a machine tool, in particular a crosscut saw, and a machine-tool severing device are already known. The machine tool here comprises a workpiece-bearing unit, for bearing a workpiece during machining, and a movably mounted tool-guide unit, on which the machine-tool severing device is arranged in an assembled state.

SUMMARY

The disclosure proceeds from a machine-tool system having at least one machine tool, in particular a crosscut saw, which has at least one workpiece-bearing unit, for bearing a workpiece during machining, and at least one movably mounted tool-guide unit, and having at least one machine-tool severing device, which is arranged in an assembled state on the tool-guide unit.

It is proposed that the machine-tool severing device has at least one cutting strand and at least one guide unit, for guiding the cutting strand. The machine tool has, in particular, a mass which is smaller than 60 kg, preferably smaller than 40 kg and particularly preferably smaller than 30 kg. The machine tool is preferably designed as a stationary machine tool which can be transported, without any transporting machine being required, by an operator. A "workpiece-bearing unit" here should be understood, in particular, as being a unit which is provided for accommodating a workpiece for machining, when the machine tool is being handled correctly, and which has at least one stop element, in particular a stop rail, against which the workpiece can be placed in order to achieve a precise cut during machining. In particular a workpiece, for machining by means of the machine tool, is positioned and/or clamped on the workpiece-bearing unit. It is particularly preferred for the workpiece-bearing unit to be formed by a machine-tool table, in particular by a machine-tool table top. The workpiece-bearing unit here is formed, in particular, from aluminum. It is also conceivable, however, for the workpiece-bearing unit to be formed from some other material which appears to be expedient to a person skilled in the art, for example plastics material, etc.

The expression "movably mounted" here is intended to define, in particular, a mounting of the tool-guide unit on the machine tool where the tool-guide unit, in particular isolated from elastic deformation of the tool-guide unit, can move along at least one linear distance greater than 10 mm, preferably greater than 50 mm and particularly preferably greater than 100 mm and/or can move about at least one axis by an angle greater than 10°, preferably greater than 45° and particularly preferably greater than 60°. A "tool-guide unit" here should be understood, in particular, as being a unit which is provided for movably mounting and/or guiding at least the machine-tool severing device in order to machine a workpiece. It is particularly preferred for the tool-guide unit to comprise at least one coupling device, which is provided for coupling the machine-tool severing device in a form-fitting and/or force-fitting manner. In particular the tool-guide unit guides the cutting strand together with the guide unit of the machine-tool severing device. The tool-guide unit is mounted preferably such that it can be moved linearly along at least one axis and/or, in addition, such that it can be pivoted about at least one further axis. It is particularly preferred for a pivot axis here to run at least essentially parallel to a bearing surface of the workpiece-bearing unit. It is also conceivable, however, for the tool-guide unit to be pivotable, in addition, about a pivot axis which runs at least essentially perpendicularly to the bearing surface of the workpiece-bearing unit. The expression "essentially perpendicularly" here is intended to define, in particular, an orientation of a direction relative to a reference direction, wherein the direction and the reference direction, in particular as seen in one plane, enclose an angle of 90° and the angle has a maximum deviation of, in particular, less than 8°, advantageously less than 5° and particularly advantageously less than 2°.

A "cutting strand" here should be understood, in particular, as being a unit which is provided for eliminating local atomic cohesion of a workpiece which is to be machined, in particular by means of particles of the workpiece being severed mechanically and/or removed mechanically. The cutting strand is preferably provided for separating the workpiece into at least two physically separate parts and/or for severing and/or removing, at least to some extent, particles of the workpiece from a surface of the workpiece. It is particularly preferred if the cutting strand, in at least one operating state, is moved in circulation, in particular along a circumference of the guide unit. A "guide unit" here should be understood, in particular, as being a unit which is provided for subjecting the cutting strand to a constraining force at least in a direction perpendicular to a cutting direction of the cutting strand, in order to predetermine possible movement of the cutting strand in the cutting direction. The guide unit preferably has at least one guide element, in particular a guide groove, by way of which the cutting strand is guided. The cutting strand, as seen in a cutting plane, is preferably guided by means of the guide element, in particular the guide groove, of the guide unit along an entire circumference of the guide unit. The guide unit is preferably designed in the form of an oblong. The term "oblong" here is intended to define, in particular, a geometrical shape which, as seen in the cutting plane, has a self-contained outer contour which comprises at least two parallel straight lines and at least two connecting portions, in particular circle arcs, by means of which in each case facing ends of the straight lines are connected to one another. The guide unit thus has a geometrical shape which, as seen in the cutting plane, is made up of a rectangle and at least two circle sectors arranged on opposite sides of the rectangle.

The expression "cutting plane" here is intended to define, in particular, a plane in which the cutting strand, in at least one operating state, is moved along a circumference of the guide unit in at least two opposite cutting directions relative to the guide unit. It is preferred for the cutting plane, during machining of a workpiece, to be oriented at least essentially transversely to a workpiece surface being machined. "At least essentially transversely" here should be understood, in particular, as being an orientation of a plane and/or of a direction relative to a further plane and/or a further direction which deviates preferably from a parallel orientation of the plane and/or of the direction relative to the further plane and/or the further direction. It is also conceivable, however, for the cutting plane, during machining of a workpiece, to be oriented at least essentially parallel to a workpiece surface being machined, in particular when the cutting strand is designed in the form of an abrasive means, etc.

"At least essentially parallel" here should be understood, in particular, as being an orientation of a direction relative to a reference direction, in particular in a plane, wherein the direction deviates from the reference direction by, in particular, less than 8°, advantageously less than 5° and particularly advantageously less than 2°. A "cutting direction" here should be understood, in particular, as being a direction in which the cutting strand, in at least one operating state, is moved, as a result of a driving force and/or of a driving torque, in particular in the guide unit, in order to generate a cutting gap and/or to sever and/or to remove particles of a workpiece which is to be machined. It is preferable for the cutting strand, in an operating state, to be moved in the cutting direction relative to the guide unit.

The cutting strand and the guide unit preferably form, together, a self-contained system. The expression "self-contained system" here is intended to define, in particular, a system which comprises at least two components which, in a state in which the system has been removed from a higher-level system, for example a machine tool, interact to maintain functionality and/or are connected to one another in captive fashion in the removed state. It is preferable for the at least two components of the self-contained system to be connected to one another at least essentially such that they cannot be released by an operator. "At least essentially such that they cannot be released" here should be understood, in particular, as being a connection of at least two components which can be separated from one another merely with the aid of severing tools, for example a saw, in particular a mechanical saw, etc., and/or chemical release agents, for example solvents, etc. Configuring the machine-tool system according to the disclosure advantageously makes it possible to achieve a compact machine tool.

It is also proposed that the machine-tool severing device, in at least one operating state, is mounted such that it can be displaced at least essentially parallel to a bearing surface of the workpiece-bearing unit. It is particularly preferred for the machine-tool severing device, in at least one operating state, to be mounted, as a result of a form-fitting and/or force-fitting connection to the coupling device of the tool-guide unit, such that it can be displaced at least essentially parallel to a bearing surface of the workpiece-bearing unit together with the tool-guide unit. It is thus advantageously possible for the machine-tool severing device to be moved relative to a workpiece which is to be machined in order to introduce a cut into the workpiece, which is butting, for example, against stop elements of the workpiece-bearing unit. It is thus possible to introduce precise cuts into a workpiece which is to be machined.

It is advantageous for the machine-tool severing device, in at least one operating state, to be mounted such that it can be pivoted relative to the workpiece-bearing unit. It is particularly preferred for the machine-tool severing device, in at least one operating state, to be mounted, as a result of a form-fitting and/or force-fitting connection to the coupling device of the tool-guide unit, such that it can be pivoted relative to the workpiece-bearing unit together with the tool-guide unit. In particular, the machine-tool severing device, together with the tool-guide unit, is mounted such that it can be pivoted about a pivot axis running parallel to the bearing surface. It is particularly preferred for the machine-tool severing device, together with the tool-guide unit, to be mounted such that it can be pivoted relative to a sub-region of the workpiece-bearing unit, in addition, about a further pivot axis, which runs at least essentially perpendicularly to the bearing surface. It is thus advantageously possible to achieve a high level of machine-tool variability in order to introduce cuts into a workpiece which is to be machined. It is advantageously possible for the machine-tool system according to the disclosure to introduce plunge cuts into a workpiece which is to be machined.

It is also proposed that the machine-tool severing device is mounted such that it can be pivoted relative to the tool-guide unit. It is particularly preferred for a pivot axis about which the machine-tool severing device is mounted such that it can be pivoted relative to the tool-guide unit to run at least essentially perpendicularly to a longitudinal axis of the tool-guide unit. It is also conceivable, however, for the machine-tool severing device to be mounted such that it can be pivoted about a pivot axis running at least essentially coaxially in relation to the longitudinal axis of the tool-guide unit. The configuration according to the disclosure advantageously makes it possible to achieve a high level of flexibility during machining of a workpiece by means of the machine-tool system according to the disclosure, in particular in respect of possible settings for positioning the machine-tool severing device for machining a workpiece.

The machine-tool system preferably comprises a further machine-tool severing device, which has at least one cutting strand and at least one guide unit, for guiding the cutting strand. The two machine-tool severing devices are preferably arranged in two cutting planes which are offset parallel to one another. It is also conceivable, however, for the two machine-tool severing devices to be arranged in a common cutting plane. The further machine-tool severing device advantageously makes it possible for groove-like cuts to be introduced in one operation into a workpiece which is to be machined.

It is additionally proposed that the machine-tool severing devices can be driven in opposite directions by means of a drive unit of the machine tool. The expression "drive unit" here is intended to define, in particular, a unit which is provided for generating forces and/or torques for driving at least one of the machine-tool severing devices. It is preferred for thermal energy, chemical energy and/or electrical energy to be converted into kinetic energy in order to generate forces and/or torques, by means of the drive unit. It is particularly preferred for the drive unit to comprise at least one rotor, which has at least one armature shaft, and at least one stator. The drive unit is preferably designed in the form of an electric-motor unit. It is also conceivable, however, for the drive unit to be configured in some other way which appears to be expedient to a person skilled in the art. The expression "in opposite directions" here is intended to define, in particular, two opposite cutting directions, wherein one of the cutting directions runs clockwise along a circumference of the corresponding guide unit and one of the two cutting directions runs counterclockwise along a circumference of the corresponding guide unit, in particular as seen from a fixed point located on a straight line running perpendicularly at least to one of the cutting planes. It is advantageously possible for the machine-tool system to achieve sawing where low reaction forces occur.

The workpiece-bearing unit is advantageously designed such that it can be pulled out at least on one side. The expression "such that it can be pulled out" here is intended to define, in particular, movable mounting at least of one sub-region of the workpiece-bearing unit at least relative to a further sub-region of the workpiece-bearing unit. It is thus advantageously possible for the bearing surface to be adapted to dimensioning of a workpiece which is to be machined.

Furthermore, the disclosure proceeds from a machine-tool severing device for a machine-tool system according to the disclosure. The machine-tool severing device comprises at least one cutting strand and at least one guide unit. It is advantageously possible to achieve a versatile tool for machining workpieces.

The machine-tool severing device advantageously comprises a torque-transmission element which is mounted, at least in part, in the guide unit. The torque-transmission element is preferably enclosed, at least in part in at least one direction, by outer walls of the guide unit. The torque-transmission element preferably has a concentric coupling recess, in which can engage a pinion of the motor unit and/or a gearwheel and/or a toothed shaft of the transmission unit in an assembled state. The coupling recess is preferably formed here by a hexagon socket. It is also conceivable, however, for the coupling recess to be configured in some other way which appears to be expedient to a person skilled in the art. Configuring the machine-tool severing device according to the disclosure can achieve, in a constructionally simple manner, a self-contained system which is straightforward for an operator to fit on a machine tool provided therefor. It is thus advantageously possible to dispense with individual fitting of components, for example of the cutting strand, the guide unit and the torque-transmission element, by the operator in order to use the machine-tool severing device according to the disclosure.

The disclosure additionally proceeds from a machine tool for a machine-tool system according to the disclosure, having at least one workpiece-bearing unit for bearing a workpiece during machining, and having at least one coupling device for coupling to a machine-tool severing device according to the disclosure. A "coupling device" here should be understood, in particular, as being a device which is provided for functionally connecting the machine-tool severing device to the machine tool by means of a form-fitting and/or force-fitting connection in order to machine a workpiece. In particular it is possible, in a state in which the coupling device is coupled to the machine-tool severing device, for forces and/or torques to be transmitted to the machine-tool severing device, in an operating state of the machine tool, by the drive unit of the machine tool in order to drive the cutting strand. The coupling device is thus preferably designed in the form of a tool mount.

The machine-tool severing device according to the disclosure and/or the machine tool according to the disclosure should not be limited here to the embodiment and use described above. In particular it is possible for the machine-tool severing device according to the disclosure and/or the machine tool according to the disclosure, in order to perform a function described herein, to have a number of individual elements, components and units which differs from a number indicated herein.

BRIEF DESCRIPTION OF THE DRAWINGS

Further advantages can be gathered from the following description of the drawings. The drawings illustrate exemplary embodiments. The drawings, the description and the claims contain numerous features in combination. A person skilled in the art will also expediently consider the features individually and combine them to give other appropriate combinations.

In the drawings.

DETAILED DESCRIPTION

Figure 1:
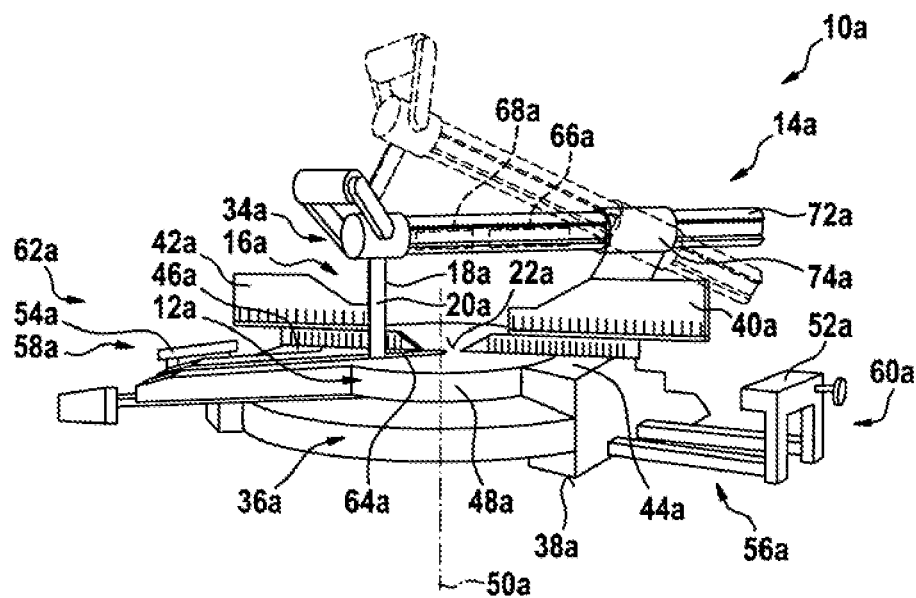
FIG. 1 shows a schematic illustration of a machine tool according to the disclosure having a machine-tool severing device according to the disclosure.

FIG. 1 shows a machine-tool system which comprises a machine tool 10a, formed by a crosscut saw, and a machine-tool severing device 16a. It is also conceivable, however, for the machine tool 10a to be designed in the form of a miter saw or of some other machine tool which appears to be expedient to a person skilled in the art. The machine tool 10a comprises a coupling device 34a, which is designed in the form of a tool mount and is intended for coupling the machine-tool severing device 16a to the machine tool 10a in a form-fitting and/or force-fitting manner. The machine-tool severing device 16a comprises a cutting strand 18a and a guide unit 20a, for guiding the cutting strand 18a. The machine tool 10a additionally comprises a movably mounted tool-guide unit 14a, on which the machine-tool severing device 16a is arranged in an assembled state by means of the coupling device 34a. The machine tool 10a also has a workpiece-bearing unit 12a, which is arranged on a basic-body unit 36a of the machine tool 10a. The tool-guide unit 14a is arranged on the workpiece-bearing unit 12a. It is also the case that the tool-guide unit 14a, at least in an operating state, is mounted such that it can be displaced at least essentially parallel to a bearing surface 22a of the workpiece-bearing unit 12a. The tool-guide unit 14a has a tool-guide rod 72a, on which the coupling device 34a is arranged, and a tool-guide bearing block 74a, which is mounted in a pivotable manner on the workpiece-bearing unit 12a. The tool-guide bearing block 74a is mounted on the workpiece-bearing unit 12a such that it can be pivoted about a pivot axis running at least essentially parallel to the bearing surface 22a of the workpiece-bearing unit 12a. The tool-guide rod 72a is mounted in a linearly movable manner on the tool-guide bearing block 74a. The tool-guide unit 14 is provided for guiding the machine-tool severing device 16a, in an assembled state, as it moves. During machining of a workpiece (not illustrated specifically here), the cutting strand 18a is guided, together with the guide unit 20a, by means of the tool-guide unit 14a as it moves. For machining workpieces, when the machine tool 10a is being handled correctly, the machine tool 10a is set down, by way of a base surface 38a of the basic-body unit 36a, on a suitable surface, for example a work top and/or a workshop floor, etc. It is also conceivable, however, for the basic-body unit 36a to have pull-out feet, by means of which the machine tool 10a can be set down on a suitable surface in order to machine workpieces. The workpiece-bearing unit 12a is provided for bearing a workpiece during machining. The workpiece-bearing unit 12a here has two stop elements 40a, 42a, which are designed in the form of stop rails and against which a workpiece which is to be machined can be placed for guidance purposes.

The workpiece-bearing unit 12a comprises a first workpiece-bearing element 44a, a second workpiece-bearing element 46a and a third workpiece-bearing element 48a. The first workpiece-bearing element 44a is formed in one piece with the basic-body unit 36a. In addition, the second workpiece-bearing element 46a of the workpiece-bearing unit 12a is likewise formed in one piece with the basic-body unit 36a. The first workpiece-bearing element 44a here is arranged on a side 60a of the basic-body unit 36a, this side being directed away from a side 62a of the basic-body unit 36a, the second workpiece-bearing element 46a being arranged on the side 62a of the basic-body unit 36a. One of the two stop elements 40a, 42a here is arranged on the first workpiece-bearing element 44a and one of the two stop elements 40a, 42a is arranged on the second workpiece-bearing element 46a. The stop elements 40a, 42a are each fixed to the first and the second workpiece-bearing elements 44a, 46a. It is also conceivable, however, for the stop elements 40a, 42a each to be connected in an adjustable manner to the first and the second workpiece-bearing elements 44a, 46a. The third workpiece-bearing element 48a, on which the tool-guide block 74a of the tool-guide unit 14a is arranged, is mounted in the basic-body unit 36a such that it can be pivoted relative to the basic-body unit 36a. The machine-tool severing device 16a is thus mounted such that it can be pivoted relative to the basic-body unit 36a together with the third workpiece-bearing element 48a. In addition, the machine-tool severing device 16a is thus mounted such that it can be pivoted relative to the first and the second workpiece-bearing elements 44a, 46a together with the third workpiece-bearing element 48a. A pivot axis 50a, about which the third workpiece-bearing element 48a is mounted in a pivotable manner in the basic-body unit 36a, runs at least essentially perpendicularly to the bearing surface 22a of the workpiece-bearing unit 12a.

The third workpiece-bearing element 48a is mounted such that it can be pivoted relative to the basic-body unit 36a by an angle of 90° overall about the pivot axis 50a, which runs at least essentially perpendicularly to the bearing surface 22a. The machine-tool severing device 16a, which is connected to the third workpiece-bearing element 48a by means of the tool-guide unit 14a, can thus be pivoted relative to the basic-body unit 36a in two opposite directions, by an angle of 45° in each case, starting from a central position, in which a cutting plane of the cutting strand 18a is arranged at least essentially perpendicularly to a stop plane of the stop elements 40a, 42a. It is also conceivable, however, for the machine-tool severing device 16a to be mounted such that it can be pivoted relative to the basic-body unit 36a by some other maximum angle about the pivot axis 50a, which runs at least essentially perpendicularly to the bearing surface 22a. It is also the case that the third workpiece-bearing element 48a, in the bearing surface 22a, has a slot-like recess 64a, into which projects the machine-tool severing device 16a, in at least one operating state. The recess 64a is provided for accommodating, at least in part, the machine-tool severing device 16a, at least in an operating state. By means of the machine-tool severing device 16a being accommodated in part in the recess 64a, a workpiece which is to be machined can be fully severed by means of the cutting strand 18a of the machine-tool severing device 16a, as seen in a direction running in the cutting plane of the cutting strand 18a, in the direction of the workpiece-bearing unit 12a.

The workpiece-bearing unit 12a also has a fourth workpiece-bearing element 52a and a fifth workpiece-bearing element 54a, which are mounted in a movable manner in the basic-body unit 36a. It is also conceivable, however, for the workpiece-bearing unit 12a to have a number of workpiece-bearing elements 44a, 46a, 48a, 52a, 54a which differs from five. The fourth workpiece-bearing element 52a is mounted such that it can be displaced linearly relative to the basic-body unit 36a by means of a guide-rail unit 56a. The fifth workpiece-bearing element 54a is mounted such that it can be displaced linearly relative to the basic-body unit 36a by means of a further guide-rail unit 58a. The fourth workpiece-bearing element 52a is arranged on the first workpiece-bearing element 44a, on the side 60a of the basic-body unit 36a. In a pushed-in state, the fourth workpiece-bearing element 52a butts flush against the first workpiece-bearing element 44a. The fifth workpiece-bearing element 54a is arranged on the second workpiece-bearing element 46a, on the side 62a of the basic-body unit 36a. In a pushed-in state, the fifth workpiece-bearing element 54a butts flush against the second workpiece-bearing element 46a. The workpiece-bearing unit 12a is thus designed such that it can be pulled out on the two sides 60a, 62a.

The machine tool 10a also has a drive unit 66a and a transmission unit 68a. The drive unit 66a and the transmission unit 68a are functionally connected to one another, in a manner which is already known to a person skilled in the art, in order to generate a driving torque which can be transmitted to the machine-tool severing device 16a. The drive unit 66a and/or the transmission unit 68a are/is provided here for being coupled to the cutting strand 18a of the machine-tool severing device 16a by means of the coupling device 34a in an assembled state of the machine-tool severing device 16a. The transmission unit 68a of the machine tool 10a is designed in the form of an angular transmission. The drive unit 66a is designed in the form of an electric-motor unit. It is also conceivable, however, for the drive unit 66a and/or the transmission unit 68a to be configured in some other way which appears to be expedient to a person skilled in the art. Furthermore, it is likewise conceivable for the drive unit 66a, separate from the transmission unit 68a, to be capable of being coupled directly to the machine-tool severing device 16a. The drive unit 66a is provided for driving the cutting strand 18a of the machine-tool severing device 16a, in at least one operating state, at a cutting speed lower than 6 m/s. The machine tool 10a here has at least one operating mode in which it is possible to drive the cutting strand 18a in the guide unit 20a of the machine-tool severing device 16a in a cutting direction 70a of the cutting strand 18a at a cutting speed lower than 6 m/s. The drive unit 66a and the transmission unit 68a are arranged in the tool-guide rod 72a of the tool-guide unit 14a. It is also conceivable, however, for the drive unit 66a to be arranged in the basic-body unit 36a and for just the transmission unit 68a to be arranged in the tool-guide unit 14a. However, other arrangements of the drive unit 66a and/or of the transmission unit 68a which appear to be expedient to a person skilled in the art are also conceivable.

It is additionally conceivable for the machine tool 10a to comprise a safeguard device (not illustrated specifically here), which senses a position of an operator's hand relative to the machine-tool severing device 16a by means of a sensor unit of the safeguard device and which, in the event of the operator being at risk, actively brakes the cutting strand 18a of the machine-tool severing device 16a and/or interrupts a power supply to the drive unit 66a. It is also conceivable for the machine tool 10a to have a guard-hood unit (not illustrated specifically here), which partially surrounds the machine-tool severing device 16a at least in an operating state. The guard-hood unit could comprise two side walls, between which the machine-tool severing device 16a is arranged in at least one operating state. It would be possible for the side walls of the guard-hood unit, in an assembled state, to run at least essentially parallel to the cutting plane of the cutting strand 18a. The guard-hood unit could be pivoted relative to the machine-tool severing device 16a in order for a workpiece to be machined. It is also conceivable, however, for the guard-hood unit to be configured in some other way which appears to be expedient to a person skilled in the art.

Figure 2:
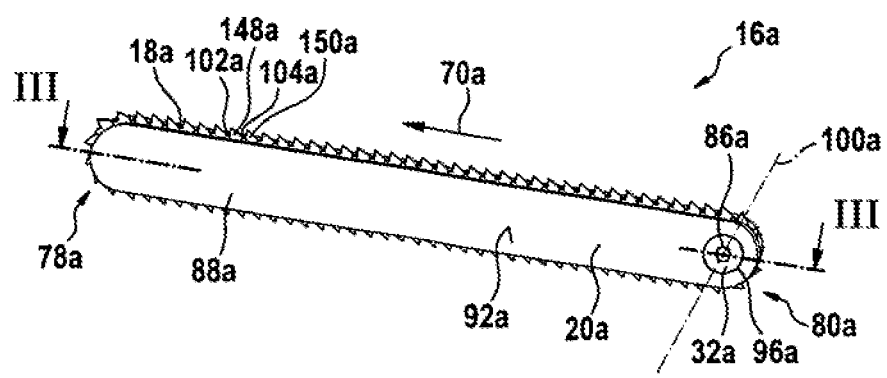
FIG. 2 shows a schematic illustration of a detail of the machine-tool severing device according to the disclosure.
Figure 6:
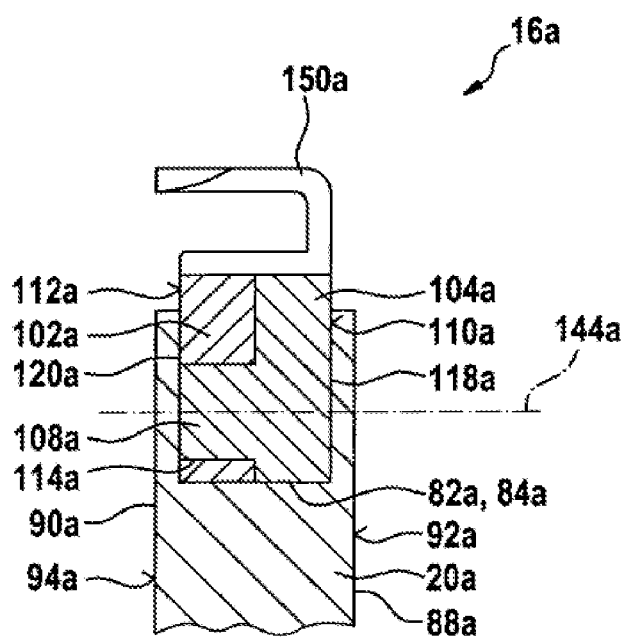
FIG. 6 shows a schematic illustration of a detail of an arrangement of the cutter-carrier elements in a guide unit of the machine-tool severing device according to the disclosure.

FIG. 2 shows the machine-tool severing device 16a in a state in which it has been separated from the coupling device 34a of the machine tool 10a. The cutting strand 18a and the guide unit 20a, together, form a self-contained system. The guide unit 20a here is designed in the form of an oblong. The guide unit 20a, as seen in the cutting plane of the cutting strand 18a, also has at least two convex ends 78a, 80a. The convex ends 78a, 80a of the guide unit 20a are arranged on two sides of the guide unit 20a which are directed away from one another. The cutting strand 18a is guided by means of the guide unit 20a. For this purpose, the guide unit 20a has at least one guide element 82a (FIG. 6), by means of which the cutting strand 18a is guided. The guide element 82a here is designed in the form of a guide groove 84a, which extends in a cutting plane of the cutting strand 18a, along an entire circumference of the guide unit 20a. The cutting strand 18a here is guided by means of peripheral regions of the guide unit 20a which bound the guide groove 84a. It is also conceivable, however, for the guide element 82a to be designed in some other way which appears to be expedient to a person skilled in the art, for example in the form of a rib-like structure which is located on the guide unit 20a and engages in a recess on the cutting strand 18a. The cutting strand 18a, as seen in a plane running perpendicularly to the cutting plane, is enclosed from three sides by the peripheral regions which bound the guide groove 84a (FIG. 6). During operation, the cutting strand 18a is moved in circulation relative to the guide unit 20a, along the circumference thereof, in the guide groove 84a.

The machine-tool severing device 16a also has a torque-transmission element 32a, which is mounted, at least in part, by means of the guide unit 20a and is intended for driving the cutting strand 18a. The torque-transmission element 32a here has a coupling recess 86a, which, in an assembled state, can be coupled to an output shaft (not illustrated specifically here) of the transmission unit 68a and/or to a gearwheel (not illustrated specifically here) which belongs to the transmission unit 68a and is arranged on the output shaft 68a. It is also conceivable, however, for the torque-transmission element 32a, in a coupled state for driving the cutting strand 18a, to be coupled directly to a pinion (not illustrated specifically here) which belongs to the drive unit 66a and is arranged on a driveshaft (not illustrated specifically here) of the drive unit 66a. The coupling recess 86a is arranged concentrically in the torque-transmission element 32a. The coupling recess 86a is designed in the form of a hexagon socket. It is also conceivable, however, for the coupling recess 86a to be configured in some other way which appears to be expedient to a person skilled in the art.

Figure 3:
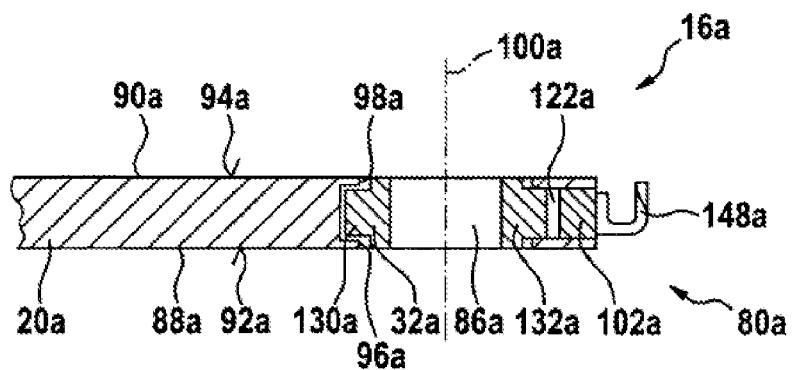
FIG. 3 shows a schematic illustration of a sectional view as seen along line III-III from FIG. 2 of the machine-tool severing device according to the disclosure.

In an uncoupled state, the torque-transmission element 32a is arranged in the guide unit 20a such that it can be moved transversely to the cutting direction 70a of the cutting strand 18a and/or in the cutting direction 70a (FIG. 3). The torque-transmission element 32a here is arranged, at least in part, between two outer walls 88a, 90a of the guide unit 20a. The outer walls 88a, 90a run at least essentially parallel to the cutting plane of the cutting strand 18a. The guide unit 20a has, in each of the outer surfaces 92a, 94a of the outer walls 88a, 90a, a recess 96a, 98a, in which the torque-transmission element 32a is arranged, at least in part.

The torque-transmission element 32a has a sub-region arranged in the recesses 96a, 98a of the outer walls 90a, 92a. The torque-transmission element 32a here, at least in the sub-region which is arranged in the recesses 96a, 98a, has an extent along an axis of rotation 100a of the torque-transmission element 32a which terminates flush with one of the outer surfaces 92a, 94a of the guide unit 20a. It is also the case that that sub-region of the torque-transmission element 32a which is arranged in the recesses 96a, 98a of the outer surfaces 92a, 94a of the guide unit 20a has outer dimensioning which extends at least essentially perpendicularly to the axis of rotation 100a of the torque-transmission element 32a and is at least 0.1 mm smaller than inner dimensioning of the recesses 96a, 98a which extends at least essentially perpendicularly to the axis of rotation 100a of the torque-transmission element 32a. That sub-region of the torque-transmission element 32a which is arranged in the recesses 96a, 98a is spaced apart in each case, as seen in a direction running perpendicularly to the axis of rotation 100a, from a periphery of the outer walls 90a, 92a which bounds the respective recess 96a, 98a. It is thus the case that that sub-region of the torque-transmission element 32a which is arranged in the recesses 96a, 98a has a degree of play within the recesses 96a, 98a.

Figure 4:
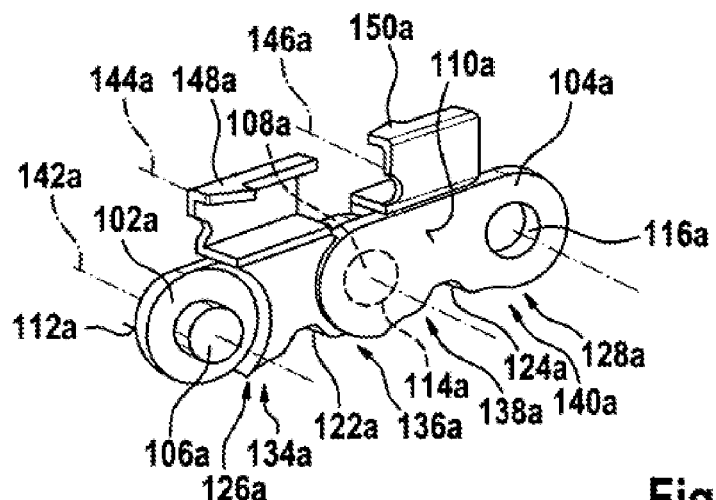
FIG. 4 shows a schematic illustration of a detail of cutter-carrier elements of a cutting strand of the machine-tool severing device according to the disclosure.

FIG. 4 shows a detail of cutter-carrier elements 102a, 104a of the cutting strand 18a of the machine-tool severing device 16a. The cutting strand 18a comprises a multiplicity of interconnected cutter-carrier elements 102a, 104a, which are connected to one another in each case by means of a connecting element 106a, 108a which belongs to the cutting strand 18a and terminates at least essentially flush with one of two outer surfaces 110a, 112a of one of the interconnected cutter-carrier elements 102a, 104a (cf. also FIG. 6). The connecting elements 106a, 108a are designed in the form of bolts. In a state in which the cutting strand 18a is arranged in the guide groove 84a, the outer surfaces 110a, 112a run at least essentially parallel to the cutting plane of the cutting strand 18a. Depending on intended usage, a person skilled in the art will select a number of cutter-carrier elements 102a, 104a which is suitable for the cutting strand 18a. The cutter-carrier elements 102a, 104a are each formed in one piece with one of the connecting elements 106a, 108a. The cutter-carrier elements 102a, 104a also each have a connecting recess 114a, 116a for accommodating one of the connecting elements 106a, 108a of the interconnected cutter-carrier elements 102a, 104a. The connecting elements 106a, 108a are guided by means of the guide unit 20a (FIG. 6). With the cutting strand 18a in an assembled state, the connecting elements 106a, 108a here are arranged in the guide groove 84*a*. It is possible for the connecting elements 106*a*, 108*a*, as seen in a plane running perpendicularly to the cutting plane, to be supported on two side walls 118*a*, 120*a* of the guide groove 84*a*. The side walls 118*a*, 120*a* bound the guide groove 84*a* in a direction running perpendicularly to the cutting plane. It is also the case that the side walls 118*a*, 120*a* of the guide groove 84*a*, as seen in the cutting plane, extend outward, starting from the guide unit 20*a*, perpendicularly to the cutting direction 70*a* of the cutting strand 18*a*.

Figure 5:
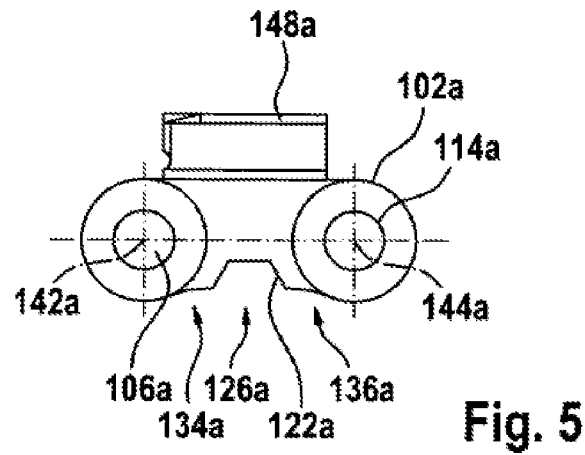
FIG. 5 shows a schematic illustration of a further detail of one of the cutter-carrier elements of the cutting strand of the machine-tool severing device according to the disclosure.

The cutter-carrier elements 102*a*, 104*a* of the cutting strand 18*a* each have a recess 122*a*, 124*a* which, in an assembled state, are each arranged on a side 126*a*, 128*a* of the respective cutter-carrier element 102*a*, 104*a*, said side being directed toward the torque-transmission element 32*a*. In at least one operating state for driving the cutting strand 18*a*, the torque-transmission element 32*a* engages in the recesses 122*a*, 124*a*. The torque-transmission element 32*a* here is designed in the form of a gearwheel. The torque-transmission element 32*a* thus comprises teeth 130*a*, 132*a* which are provided for engaging, in at least one operating state for driving the cutting strand 18*a*, in the recesses 122*a*, 124*a* of the cutter-carrier elements 102*a*, 104*a*. It is also the case that the sides 126*a*, 128*a* of the cutter-carrier elements 102*a*, 104*a*, these sides being directed toward the torque-transmission element 32*a*, are designed in the form of circle arcs. The sides 126*a*, 128*a* of the cutter-carrier elements 102*a*, 104*a*, these sides being directed toward the torque-transmission element 32*a* in an assembled state, each have sub-regions 134*a*, 136*a*, 138*a*, 140*a* configured in the form of circle arcs, as seen between a center axis 142*a* of the respective connecting element 106*a*, 108*a* and a center axis 144*a*, 146*a* of the respective connecting recess 114*a*, 116*a*. The circle-arc-formed sub-regions 134*a*, 136*a*, 138*a*, 140*a* are each formed adjacently to the recesses 122*a*, 124*a*, in which the torque-transmission element 32*a* engages. The circle-arc-formed sub-regions 134*a*, 136*a*, 138*a*, 140*a* here have a radius which corresponds to a radius of the guide groove 84*a* at the convex ends 78*a*, 80*a*. The sub-regions 134*a*, 136*a*, 138*a*, 140*a* are of concave design (FIG. 5).

The cutting strand 18*a* also has cutting elements 148*a*, 150*a*. The cutting elements 148*a*, 150*a* are each formed in one piece with one of the cutter-carrier elements 102*a*, 104*a*. It is also conceivable, however, for the cutting elements 148*a*, 150*a* to be formed separately from the cutter-carrier elements 102*a*, 104*a*. The number of cutting elements 148*a*, 150*a* is dependent on the number of cutter-carrier elements 102*a*, 104*a*. A person skilled in the art will select a suitable number of cutting elements 148*a*, 150*a*, depending on the number of cuttercarrier elements 102*a*, 104*a*. The cutting elements 148*a*, 150*a* are provided so that particles of a workpiece which is to be machined can be severed and/or removed. The cutting elements 148*a*, 150*a* may be designed, for example, in the form of full chisels, half chisels or other types of cutter which appear to be expedient to a person skilled in the art, and are provided so that particles of a workpiece which is to be machined can be severed and/or removed. The cutting strand 18*a* is of endless design. The cutting strand 18*a* is thus designed as a cutting chain. The cutter-carrier elements 102*a*, 104*a* here are designed as chain links which are connected to one another by means of the bolt-form connecting elements 106*a*, 108*a*. It is also conceivable, however, for the cutting strand 18*a*, the cutter-carrier elements 102*a*, 104*a* and/or the connecting elements 106*a*, 108*a* to be configured in some other way which appears to be expedient to a person skilled in the art.

FIGS. 7 to 11 illustrate two alternative exemplary embodiments. Essentially like components, features and functions are denoted, in principle, using the same designations. In order to differentiate between the exemplary embodiments, the letters a to c have been added to the designations of the exemplary embodiments. The following description is limited essentially to the differences from the first exemplary embodiment in FIGS. 1 to 6, and, in respect of like components, features and functions, reference can be made to the description of the first exemplary embodiment in FIGS. 1 to 6.

Figure 7:
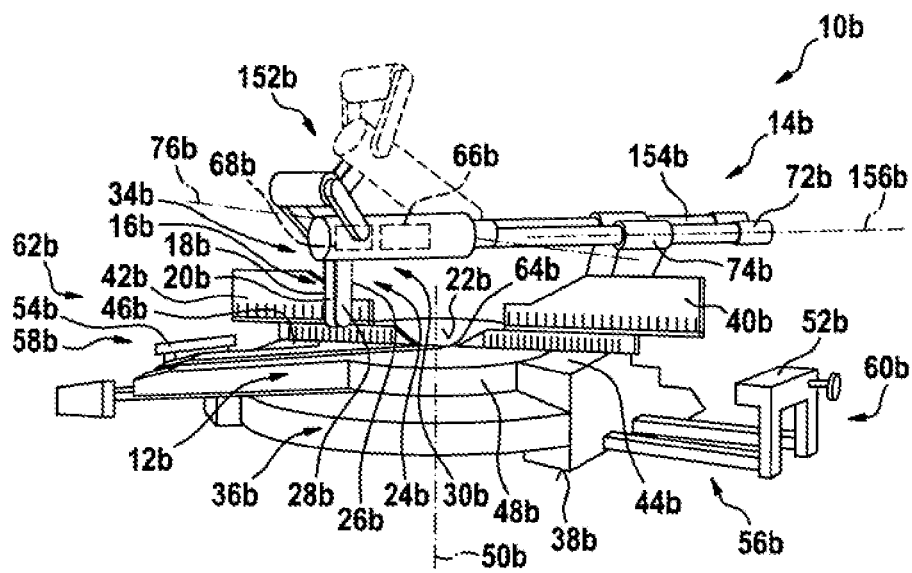
FIG. 7 shows a schematic illustration of an alternative machine tool according to the disclosure having a machine-tool severing device according to the disclosure.

FIG. 7 shows an alternative machine-tool system, which comprises a machine tool 10*b*, formed by a crosscut saw, and a machine-tool severing device 16*b*. The machine-tool severing device 16*b* has a cutting strand 18*b* and a guide unit 20*b*, for guiding the cutting strand 18*b*. The machine-tool severing device 16*b* also has a construction analogous to the machine-tool severing device 16*a* described in FIGS. 1 to 6. The machine tool 10*b* comprises a workpiece-bearing unit 12*b*, for bearing a workpiece (not illustrated specifically here) during the machining, and a movably mounted tool-guide unit 14*b*. The workpiece-bearing unit 12*b* is arranged on a basic-body unit 36*b* of the machine tool 10*b*. The machine-tool severing device 16*b*, in an assembled state, is arranged on the tool-guide unit 14*b* by means of a coupling device 34*b*.

The tool-guide unit 14*b* is arranged on the workpiece-bearing unit 12*b*. The tool-guide unit 14*b* here comprises two tool-guide rods 72*b*, 154*b*, on which is arranged a cutting module 152*b* belonging to the machine tool 10*b* and comprising the coupling device 34*b*, and a tool-guide bearing block 74*b*, which is connected to the workpiece-bearing unit 12*b*. The machine-tool severing device 16*b* is mounted, together with the tool-guide unit 14*b*, such that it can be pivoted relative to the basic-body unit 36*b* at least essentially perpendicularly to a bearing surface 22*b* of the workpiece-bearing unit 12*b*. The tool-guide rods 72*b*, 154*b* are mounted on the tool-guide bearing block 74*b* such that they can be displaced linearly at least essentially parallel to the bearing surface 22*b*. The cutting module 152*b* comprises a drive unit 66*b* and a transmission unit 68*b* of the machine tool 10*b*, for driving the cutting strand 18*b*. It is also the case that the cutting module 152*b* is mounted such that it can be pivoted relative to the tool-guide unit 14*b*. A pivot axis 76*b*, about which the cutting module 152*b* is mounted such that it can be pivoted relative to the tool-guide unit 14*b*, runs at least essentially parallel to the bearing surface 22*b* and at least essentially perpendicularly to a longitudinal axis 156*b* of one of the tool-guide rods 72*b*, 154*b*. It is also conceivable, however, for the cutting module 152*b* to run, in addition, at least essentially parallel to the longitudinal axis 156*b* of one of the tool-guide rods 72*b*, 154*b*. It is thus the case that the machine-tool severing device 16*b*, in an assembled state, is mounted such that it can be pivoted relative to the tool-guide unit 14*b* by means of the coupling device 34*b* of the cutting module 152*b*.

The machine-tool system also has a further machine-tool severing device 24*b*, which has a further cutting strand 26*b* and a further guide unit 28*b*, for guiding the further cutting strand 26*b*. The further machine-tool severing device 24*b* has a construction analogous to the machine-tool severing device 16*b*. The machine tool 10*b* here comprises a further coupling device 30*b* for coupling the further machine-tool severing device 24*b* to the machine tool 10*b* in a form-fitting and/or force-fitting manner. The machine-tool severing device 14*b* and the further machine-tool severing device 24*b*, in an assembled state, are arranged in cutting planes of the respective cutting strands 18b, 26b which are offset at least essentially parallel to one another. It is also the case that the machine-tool severing device 14b and the further machine-tool severing device 24b, in at least one operating state, can be driven in opposite directions by means of the drive unit 66b of the machine tool 10b.

Figure 8:
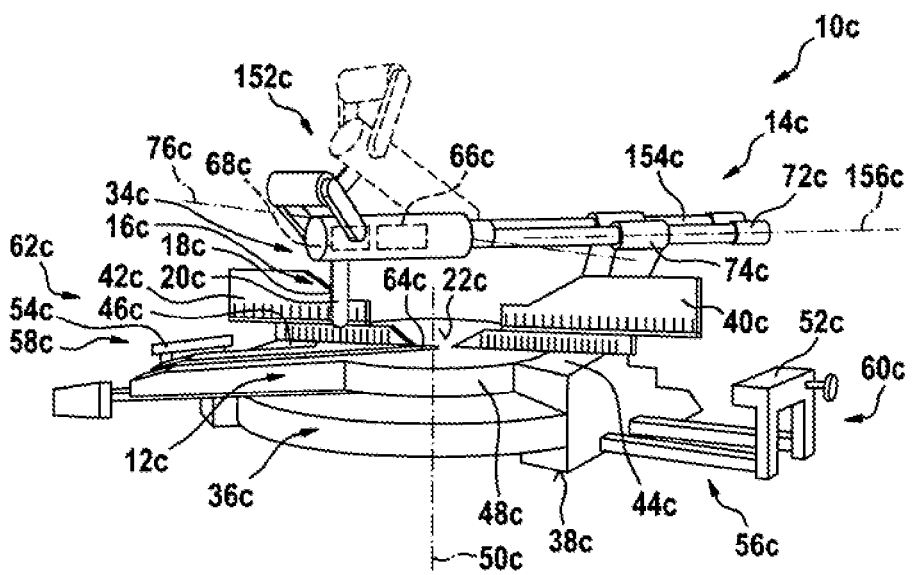
FIG. 8 shows a schematic illustration of a further alternative machine tool according to the disclosure having a machine-tool severing device according to the disclosure.
Figure 9:
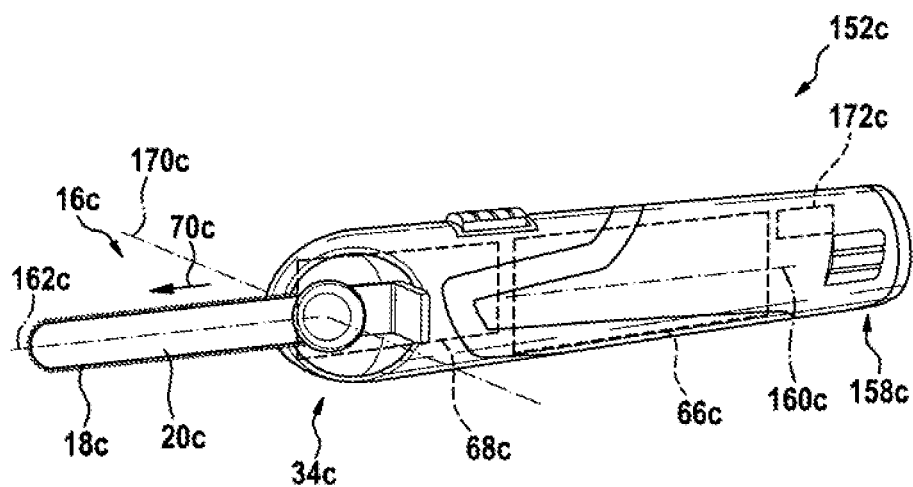
FIG. 9 shows a schematic illustration of a detail of a cutting module of the machine tool of FIG. 8, said cutting module being designed in the form of a portable machine tool.

FIG. 8 shows a further alternative machine-tool system, which comprises a machine tool 10c, formed by a crosscut saw, and a machine-tool severing device 16c. The machine-tool severing device 16c has a cutting strand 18c and a guide unit 20c, for guiding the cutting strand 18c. The machine-tool severing device 16c also has a construction analogous to the machine-tool severing device 16a described in FIGS. 1 to 6. The machine tool 10c comprises a workpiece-bearing unit 12c, for bearing a workpiece (not illustrated specifically here) during the machining, and a movably mounted tool-guide unit 14c. The workpiece-bearing unit 12c is arranged on a basic-body unit 36c of the machine tool 10c. The machine-tool severing device 16c, in an assembled state, is arranged on the tool-guide unit 14c by means of a coupling device 34c.

The tool-guide unit 14c is arranged on the workpiece-bearing unit 12c. The tool-guide unit 14c here comprises two tool-guide rods 72c, 154c, on which is arranged a cutting module 152c belonging to the machine tool 10c and comprising the coupling device 34c, and a tool-guide bearing block 74c, which is connected to the workpiece-bearing unit 12c. The machine-tool severing device 16c is mounted, together with the tool-guide unit 14c, such that it can be pivoted relative to the basic-body unit 36c about an at least essentially perpendicularly to a bearing surface 22c of the workpiece-bearing unit 12c. The tool-guide rods 72c, 154c are mounted on the tool-guide bearing block 74c such that they can be displaced linearly at least essentially parallel to the bearing surface 22c. The cutting module 152c comprises a drive unit 66c and a transmission unit 68c of the machine tool 10c, for driving the cutting strand 18c. It is also the case that the cutting module 152c is mounted such that it can be pivoted relative to the tool-guide unit 14c. A pivot axis 76c, about which the cutting module 152c is mounted such that it can be pivoted relative to the tool-guide unit 14c, runs at least essentially parallel to the bearing surface 22c and at least essentially perpendicularly to a longitudinal axis 156c of one of the tool-guide rods 72c, 154c. It is also conceivable, however, for the cutting module 152c to run, in addition, about an at least essentially parallel to the longitudinal axis 156c of one of the tool-guide rods 72c, 154c. It is thus the case that the machine-tool severing device 16c, in an assembled state, is mounted such that it can be pivoted relative to the tool-guide unit 14c by means of the coupling device 34c of the cutting module 152c. It is also the case that the cutting module 152c is arranged in a removable manner on the tool-guide rods 72c, 154c. The cutting module 152c is thus provided so that it can be removed from the tool-guide rods 72c, 154c and operated as a portable machine tool. The cutting module 152c here has an energy-supply coupling unit 158c (FIG. 9), which can be coupled by a power plug (not illustrated specifically here) to a mains supply and/or to a storage battery (not illustrated specifically here).

Figure 10:
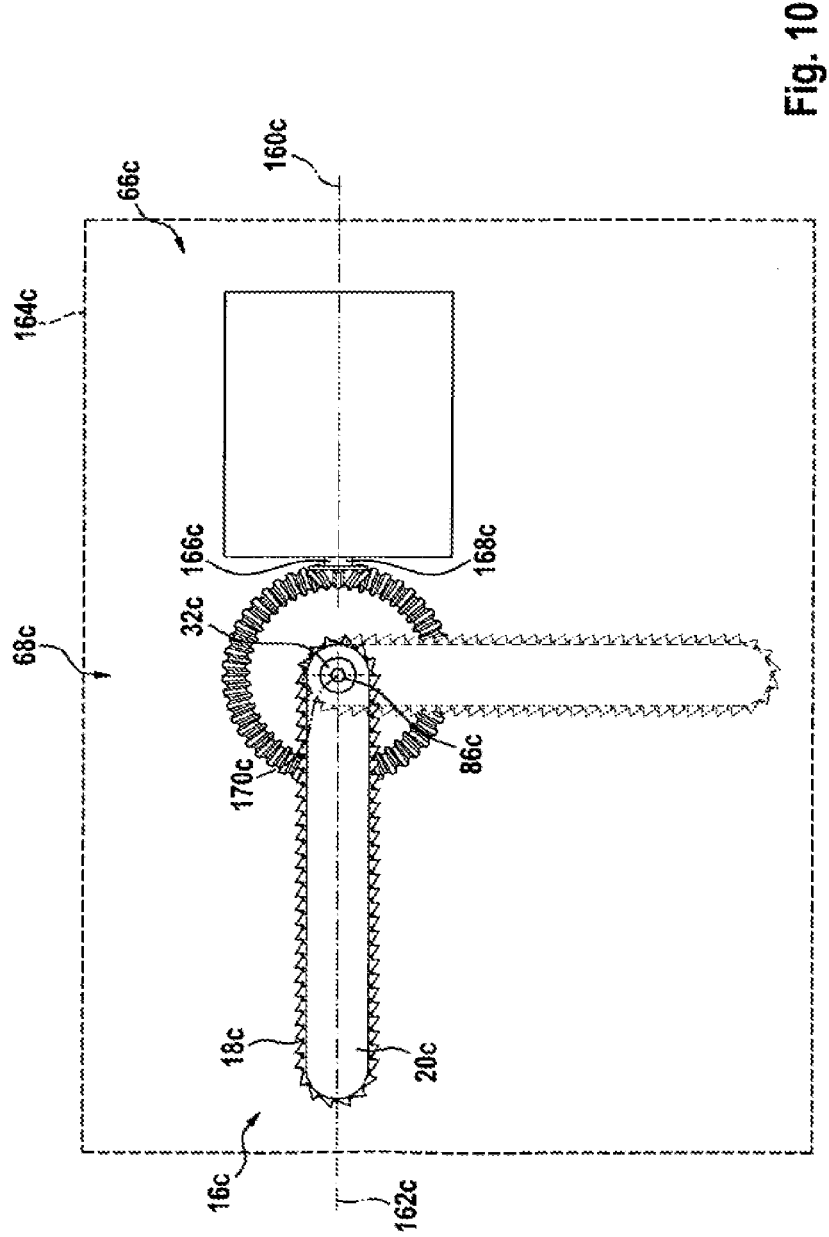
FIG. 10 shows a schematic illustration of a detail of an arrangement of a drive unit of the machine tool of FIG. 8 and of the machine-tool severing device according to the disclosure.

FIG. 10 shows a detail of an arrangement of the drive unit 66c, which is arranged in the cutting module 152c, and of the transmission unit 68c, which is arranged in the cutting module 152c, both belonging to the machine tool 10c, in a state in which the coupling device 34c is coupled to the machine-tool severing device 16c. In a state in which the coupling device 34c is coupled to the machine-tool severing device 16c, a longitudinal axis 160c of the drive unit 66c and a longitudinal axis 162c of the guide unit 20c are arranged at least essentially in a common plane 164c. The longitudinal axis 160c of the drive unit here runs coaxially in relation to a driveshaft 166c of the drive unit 66c. The driveshaft 166c is designed in the form of an armature shaft 168c. As seen in a cutting plane of the cutting strand 18c, the longitudinal axis 162c of the guide unit 20c runs at least essentially parallel to two at least essentially parallel straight lines of an outer contour of the guide unit 20c.

The coupling device 34c, at least in a state in which it is coupled to the machine-tool severing device 16c, is mounted such that it can be moved relative to the drive unit 66c. The coupling device 34c here can move along at least one linear distance and/or about an axis in a manner which is independent of a purely closing movement of the coupling device 34c for functionally connecting the machine-tool severing device 16c to the cutting module 152c and/or independent of a purely opening movement of the coupling device 34c for releasing the functional connection of the machine-tool severing device 16c to the cutting module 152c. The coupling device 34c can be moved in order for a workpiece to be machined by the machine-tool severing device 16c, which is functionally coupled to the cutting module 152c by means of the coupling device 34c. The coupling device 34c can be moved manually, as a result of an operator subjecting the coupling device 34c to the action of force, into a position desired by the operator. It is also conceivable, however, for the cutting module 152c to comprise a coupling-device drive unit (not illustrated specifically here), which is provided for driving the coupling device 34c in order to execute a movement which is independent of the opening movement and/or of the closing movement. The coupling-device drive unit may be designed, for example, in the form of an electric-motor unit or in the form of some other coupling-device drive unit which appears to be expedient to a person skilled in the art.

At least in a state in which it is coupled to the machine-tool severing device 16c, the coupling device 34c is mounted such that it can be pivoted relative to the drive unit 66c. The coupling device 34c is mounted such that it can be pivoted about a pivot axis 170c, which runs at least essentially perpendicularly to the longitudinal axis 160c of the drive unit 66c. It is also the case that, in a state in which it has been separated from the machine-tool severing device 16c, the coupling device 34c can be pivoted relative to the drive unit 66c about the pivot axis 170c, which runs at least essentially perpendicularly to the longitudinal axis 160c of the drive unit. It is also conceivable, however, for the coupling device 34c to be mounted such that it can be pivoted, in addition, about a pivot axis running at least essentially parallel to the longitudinal axis 160c of the drive unit 66c. The longitudinal axis 160c of the drive unit here runs coaxially in relation to an axis of rotation of the armature shaft 168c. In order for a workpiece to be machined by the machine-tool severing device 16c, which is functionally coupled to the cutting module 152c by means of the coupling device 34c, the coupling device 34c can be pivoted about the pivot axis 170c. It is possible here for the coupling device 34c to be pivoted in an angle range of 180°. It is also conceivable, however, for the coupling device 34c to be pivoted in an angle range other than 180°, for example in an angle range of 270°, etc. The angle range of 180° here is formed by angle sub-ranges which, starting from the longitudinal axis 160c of the drive unit in each case, extend by 90° in opposite directions. The coupling device 34c can be fixed in any desired position in the angle range of 180°. Fixing of the coupling device 34*c* can be achieved by means of a latching device (not illustrated specifically here) or some other device which appears to be expedient to a person skilled in the art, for example a clamping device, etc.

The cutting module 152*c* also comprises a driving-direction reversal unit 172*c*, which is provided for changing a driving direction of the drive unit 66*c* in dependence on a relative angular position of the coupling device 34*c* in the angle range of 180°. The driving-direction reversal unit 172*c* is designed in the form of an electronics module, which is provided for intervening in a motor-control means, for controlling the drive unit 66*c*, in order to change the driving direction. When the coupling device 34*c* reaches and/or exceeds a predetermined angle within the angle range of 180°, the polarity of a power supply of the drive unit 66*c*, which is designed in the form of an electric-motor unit, is reversed by means of the driving-direction reversal unit 172*c*, in order to change the driving direction. The drive unit 66*c*, which is designed in the form of an electric-motor unit, changes the driving direction as a result of the polarity of the power supply being reversed. It is also conceivable, however, for the driving-direction reversal unit 172*c* to change the driving direction in some other way which appears to be expedient to a person skilled in the art, for example by changing over two phases of a power supply, etc. The cutting direction 70*c* of the cutting strand 18*c* changes orientation as a result of the change in the driving direction of the drive unit 66*c*. When the driving direction changes, the cutting direction 70*c* runs in a direction counter to the original orientation of the cutting direction 70*c*.

When a workpiece is being machined by means of the machine-tool severing device 16*c*, which is functionally connected to the cutting module 152*c* by the coupling device 34*c*, with the coupling device 34*c* in a position within the angle range of 180° in which the longitudinal axis 162*c* of the guide unit 20*c* is oriented at least essentially coaxially in relation to the longitudinal axis 160*c* of the drive unit, it is possible for the operator to pivot the coupling device 34*c* by 90° in opposite directions in each case starting from the longitudinal axis 160*c* of the drive unit. The angle about which the coupling device 34*c* is pivoted here is taken as being between the longitudinal axis 160*c* of the drive unit and the longitudinal axis 162*c* of the guide unit 20*c*. It is thus possible for the operator to pivot the coupling device 34*c*, relative to the drive unit 66*c*, into a position which is suitable for machining a workpiece by means of the machine-tool severing device 16*c*.

The invention claimed is:

1. A machine-tool system comprising:
    at least one machine tool including at least one workpiece-bearing unit configured to support a workpiece during machining, and a drive unit operably coupled to at least one movably mounted tool-guide unit, the tool-guide unit having a transmission unit arranged at least partially within a tool-guide rod of the tool-guide unit, the tool-guide rod slidably received within a tool-guide bearing block, the movably mounted tool-guide unit pivotably attached to the at least one workpiece-bearing unit and pivotable about a pivot axis which is perpendicular to a bearing surface of the at least one workpiece-bearing unit; and
    at least one machine-tool severing device removably arranged on the tool-guide unit, wherein the machine-tool severing device includes at least one cutting strand and at least one guide unit configured to guide the at least one cutting strand, the cutting strand having an internal circumference smaller than an external circumference of the at least one guide unit, such that the at least one cutting strand is retained on the at least one guide unit when the machine-tool severing device is removed from the tool-guide unit, wherein the at least one machine-tool severing device, in at least one operating state, is mounted such that the at least one machine-tool severing device is displaceably guided by the tool-guide unit at least essentially parallel to a bearing surface of the at least one workpiece-bearing unit.

2. The machine-tool system as claimed in claim 1, wherein the at least one machine-tool severing device, in the at least one operating state, is mounted pivotably relative to the at least one workpiece-bearing unit.

3. The machine-tool system as claimed in claim 1, wherein the workpiece-bearing unit includes a first workpiece bearing element configured to be selectively pulled away from a second work-piece bearing element.

4. The machine-tool system of claim 1, wherein the at least one machine tool is a saw.

5. The machine-tool system of claim 1, wherein the at least one machine-tool severing device, in the at least one operating state, is mounted such that the at least one machine-tool severing device is displaceable in a straight line at least essentially parallel to the bearing surface of the at least one workpiece-bearing unit.

6. The machine-tool system of claim 1, wherein:
    the at least one workpiece-bearing unit comprises a first workpiece-bearing element upon which the workpiece is directly supported when the workpiece is supported and a second workpiece-bearing element upon which the workpiece is directly supported when the workpiece is supported; and
    the first workpiece-bearing element is selectively movable toward or away from the second workpiece-bearing element.

7. The machine-tool system of claim 6, wherein an upper bearing surface portion of the first workpiece-bearing element is coplanar with an upper bearing surface portion of the second workpiece-bearing element as the first workpiece bearing element moves toward or away from the second workpiece-bearing unit.

8. The machine-tool system of claim 1, wherein the machine-tool severing device further comprises a transmission element.

9. The machine-tool system of claim 1, wherein:
    the at least one machine-tool severing device is displaceably guided by the tool-guide rod in a direction parallel to the bearing surface.

10. The machine-tool system of claim 1, wherein the tool-guide rod defines a movement axis along which the at least one machine-tool severing device is displaceably guided by the tool-guide unit.

11. The machine-tool system of claim 1, wherein the cutting strand is movable along the at least one guide unit.

12. The machine-tool system of claim 1, wherein the drive unit is arranged at least partially within the tool-guide rod of the tool-guide unit.

13. The machine-tool system of claim 1, wherein
    the drive unit has a first portion which rotates about a first axis;
    the transmission unit has a second portion which rotates about a second axis; and
    the first axis is perpendicular to the second axis.

14. A machine tool for a machine-tool system, comprising:

at least one workpiece-bearing unit defining a plane and configured to support a workpiece during machining;

a drive unit supported by a movably mounted tool-guide unit pivotably attached to the at least one workpiece-bearing unit and pivotable about a pivot axis which is perpendicular to the plane defined by the at least one workpiece-bearing unit; and at least one coupling device operably coupled to the drive unit and configured to couple directly to a machine-tool severing device having at least one cutting strand, a transmission element configured to drive the at least one cutting strand, the transmission unit arranged at least partially within a tool-guide rod of the tool-guide unit, the tool-guide rod slidably received within a tool-guide bearing block, and at least one guide unit configured to guide the at least one cutting strand with the at least one cutting strand having an internal circumference smaller than an external circumference of the at least one guide unit, such that the at least one cutting strand is retained on the at least one guide unit when the machine-tool severing device is removed from the tool-guide unit, the at least one coupling device configured to move in a straight line along a movement axis parallel to the plane, wherein the drive unit is configured to couple with the transmission element to transmit torque to the transmission element.

15. The machine-tool of claim 14, wherein:

the at least one workpiece-bearing unit comprises a first workpiece-bearing element upon which the workpiece is directly supported when the workpiece is supported and a second workpiece-bearing element upon which the workpiece is directly supported when the workpiece is supported; and the first workpiece-bearing element is selectively movable toward or away from the second workpiece-bearing element.

16. The machine-tool of claim 15, wherein an upper bearing surface portion of the first workpiece-bearing element is coplanar with an upper bearing surface portion of the second workpiece-bearing element as the first workpiece bearing element moves toward or away from the second workpiece-bearing unit.

17. The machine-tool of claim 14, wherein:

the tool-guide rod is configured to displaceably guide the machine-tool severing device at least essentially parallel to a bearing surface of the at least one workpiece-bearing unit.

* * * * *